Patented Oct. 10, 1939

2,175,796

UNITED STATES PATENT OFFICE 2,175,796

MONOAZO DYESTUFFS SOLUBLE IN WATER

Erich Fischer and Walter Gmelin, Bad Soden in Taunus, Germany, assignors to General Aniline Works, Inc., New York, N. Y., a corporation of Delaware No Drawing. Application March 19, 1938, Serial No. 196,902. In Germany March 24, 1937

5 Claims. (Cl. 260—199)

The present invention relates to monoazo-dyestuffs soluble in water; more particularly, it relates to dyestuffs of the general formula:

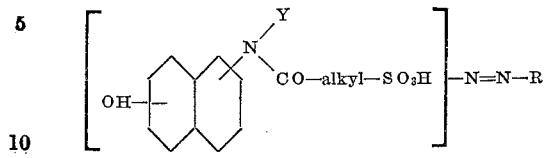

wherein R means a radical of the benzene series not containing any group lending solubility and Y stands for hydrogen or alkyl.

We have found that valuable mono-azo-dyestuffs soluble in water are obtainable by combining an acid or alkaline medium with any diazo-compound of the benzene series which does not contain any group lending solubility, an amino-hydroxynaphthalene of the general constitution:

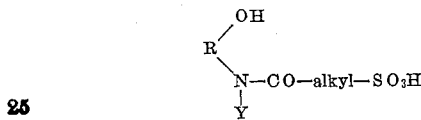

wherein R means a naphthalene nucleus which may be further substituted, but must not contain a sulfonic acid group, and Y stands for hydrogen or alkyl.

The dyestuffs thus obtained are especially suitable for dyeing wool orange-yellow, red to blue-red tints from an acid bath below boiling temperature at 60° C. to 90° C.

The sulfacylamino-hydroxynaphthalenes used as coupling-components may be obtained by the action of chloralkylcarboxylic acid chlorides on the corresponding amino-hydroxynaphthalenes and subsequent reaction, for instance, with sodium sulfite.

The following examples serve to illustrate the invention, but they are not intended to limit it thereto, the parts being by weight, unless otherwise stated. The ratio between parts by weight and parts by volume is that which exists between the kilo and the liter:

1. Into a solution of 267 parts of 2-sulfacetamino-7-hydroxynaphthalene, water and 212 parts of sodium carbonate there is run a diazo-solution prepared in the usual manner from 93 parts of aminobenzene. When the coupling is complete the dyestuff is salted out, filtered with suction and dried. It dyes wool throughout from an acid bath below boiling temperature, for instance, at 60° C. to 80° C., orange-yellow even tints. The dyestuff corresponds with the following formula:

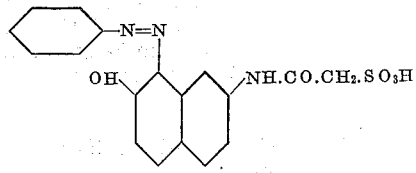

2. If in Example 1 the aminobenzene is exchanged for 107 parts of 1-amino-2-methylbenzene, a dyestuff is obtained which dyes wool throughout under the same conditions orange-red even tints.

3. If in Example 1 the aminobenzene is exchanged for 127.5 parts of 1-amino-4-chlorobenzene, a dyestuff of similar properties is obtained. Wool is dyed throughout below boiling temperature clear orange tints.

4. A dyestuff dyeing wool throughout from an acid bath at 60° C. to 80° C. red even tints is obtained by coupling a diazo-compound prepared in the usual manner from 150 parts of 4-amino-acetanilide with a solution of 267 parts of 2-sulfacetamino-7-hydroxynaphthalene rendered alkaline by means of sodium carbonate.

5. By mixing a solution of 267 parts of 2-sulfacetamino-7-hydroxynaphthalene rendered alkaline by means of sodium carbonate with a diazo-solution obtained in the usual manner from 258 parts of 3-amino-4-methoxybenzene-2-sulfonic acid diethylamide, a dyestuff is obtained which dyes wool throughout below boiling temperature in an acid bath violet even tints.

6. 123 parts of 1-amino-4-methoxybenzene are diazotised in the usual manner and combined with a solution rendered alkaline by means of sodium carbonate of 267 parts of 1-sulfacetamino-7-hydroxynaphthalene. The dyestuff is isolated in the usual way. It dyes wool throughout from an acid bath at 80° C. blue-red even tints.

7. If in Example 6 the 1-amino-4-methoxybenzene is exchanged for 151 parts of 1-aminobenzene-2-carboxylic acid methyl-ester, a dyestuff is obtained which dyes wool throughout from an acid bath at 70° C. to 80° C. yellow-red even tints.

8. 147 parts of 1-amino-5.6.7.8-tetrahydronaphthalene are diazotised in the usual manner. The diazo-compound obtained is introduced into an aqueous solution of 267 parts of 1-sulfacetamino-7-hydroxynaphthalene and sodium carbonate in excess. The dyestuff obtained is separated by means of sodium chloride and dried.

It dyes wool below boiling temperature from an acid bath bluish-red tints.

9. If in Example 1 the 2-sulfacetamino-7-hydroxynaphthalene is exchanged for 281 parts of 2-sulfacet-methylamino-7-hydroxynaphthalene, a dysteuff of similar properties is obtained.

10. If in Example 6 the 1-sulfacetamino-7-hydroxynaphthalene is exchanged for 295 parts of 1-sulfacet-ethylamino-7-hydroxynaphthalene, a dyestuff of similar properties is obtained.

11. If in Example 1 the 2-sulfacetamino-7-hydroxynaphthalene is exchanged for 267 parts of 2-sulfacetamino-8-hydroxynaphthalene, a dyestuff is obtained which dyes wool below boiling temperature orange-red tints.

12. By using in Example 1 instead of 2-sulfacetamino-7-hydroxynaphthalene 267 parts of 1-sulfacetamino-6-hydroxynaphthalene, a dyestuff is obtained which dyes wool throughout below boiling temperature blue-red even tints.

13. A dyestuff yielding on wool below boiling temperature from an acid bath blue-red tints is obtained by combining a diazo-solution from 93 parts of aminobenzene with a solution of 281 parts of 1-sulfopropionylamino-7-hydroxynaphthalene rendered alkaline by means of sodium carbonate.

We claim:

1. The water-soluble azo-dyestuffs of the following general formula:

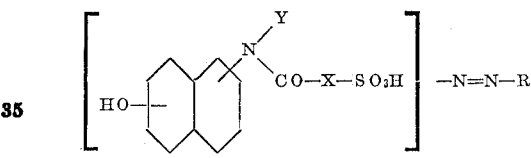

wherein R means a radical of the benzene series not containing a group lending solubility, Y stands for one of the group consisting of hydrogen, methyl and ethyl, and X for one of the group consisting of methyl and ethyl, being yellow-red to dark red powders which dye wool in an acid bath below boiling temperature, at 60° C. to 90° C., orange-yellow, red to blue-red even shades.

2. The water-soluble azo-dyestuffs of the following general formula:

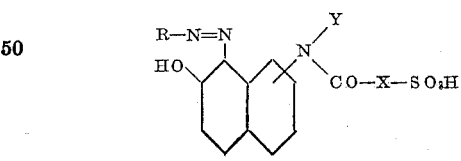

wherein R means a radical of the benzene series not containing a group lending solubility, Y stands for one of the group consisting of hydrogen, methyl and ethyl, and X for one of the group consisting of methyl and ethyl, being yellow-red to dark red powders which dye wool in an acid bath below boiling temperature, at 60° C. to 90° C., orange-yellow, red to blue-red even shades.

3. The water-soluble azo-dyestuff of the following formula:

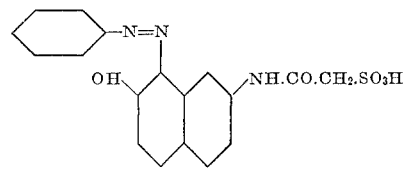

being a red powder which dyes wool throughout in an acid bath below boiling temperature, for instance, at 60° C. to 80° C., orange-yellow even shades.

4. The water-soluble azo-dyestuff of the following formula:

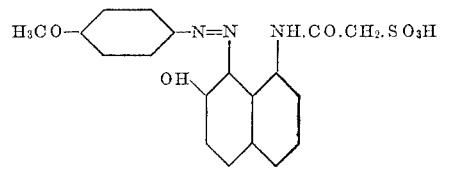

being a red powder which dyes wool throughout in an acid bath at 80° C. blue-red even shades.

5. The water-soluble azo-dyestuff of the following formula:

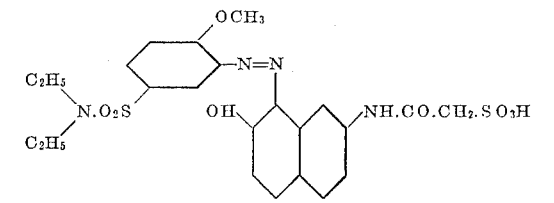

being a red powder which dyes wool throughout in an acid bath below boiling temperature violet even shades.

ERICH FISCHER.
WALTER GMELIN.